(12) United States Patent
Willis

(10) Patent No.: US 11,788,566 B2
(45) Date of Patent: Oct. 17, 2023

(54) COMPOSITE FERRULES FOR EXTENSION POLES

(71) Applicant: Jameson, LLC, Clover, SC (US)

(72) Inventor: Christopher Ryan Willis, Clover, SC (US)

(73) Assignee: Jameson, LLC, Clover, SC (US)

( * ) Notice: Subject to any disclaimer, the term of this patent is extended or adjusted under 35 U.S.C. 154(b) by 13 days.

(21) Appl. No.: 16/488,446

(22) PCT Filed: Aug. 20, 2019

(86) PCT No.: PCT/US2019/047187
§ 371 (c)(1),
(2) Date: Aug. 23, 2019

(87) PCT Pub. No.: WO2020/101782
PCT Pub. Date: May 22, 2020

(65) Prior Publication Data
US 2021/0310507 A1 Oct. 7, 2021

Related U.S. Application Data

(60) Provisional application No. 62/768,338, filed on Nov. 16, 2018.

(51) Int. Cl.
*F16B 7/18* (2006.01)
*B25G 1/04* (2006.01)

(52) U.S. Cl.
CPC ............. *F16B 7/182* (2013.01); *B25G 1/04* (2013.01); *F16B 7/18* (2013.01)

(58) Field of Classification Search
CPC ... F16B 7/18; F16B 7/182; B25G 1/04; B25G 1/043; B25G 1/046
See application file for complete search history.

(56) References Cited

U.S. PATENT DOCUMENTS 2,286,418 A * 6/1942 Hoyt .................... A01G 3/0255
30/144
3,249,091 A * 5/1966 Griesbach .............. B43K 29/18
D19/123

(Continued)

FOREIGN PATENT DOCUMENTS

GB 564526 A 10/1944

OTHER PUBLICATIONS

Budhe, S., Ghumatkar, A., Btrajdar, N. et al. Effect of surface roughness using different adherend materials on the adhesive bond strength. Appl Adhes Sci 3, 20 (2015). https://doi.org/10.1186/s40563-015-0050-4; published Dec. 14, 2015; 10 pages.

(Continued)

*Primary Examiner* — Adam J Eiseman
*Assistant Examiner* — Richard D Crosby, Jr.
(74) *Attorney, Agent, or Firm* — Shumaker, Loop & Kendrick, LLP; S. Alexander Long, Jr.

(57) ABSTRACT

A ferrule connection interface may have a first composite ferrule having an outwardly threaded portion opposite a pole receiving portion. The interface may have a first pole bonded via an engineered adhesive to the first composite ferrule at the pole receiving portion of the first composite ferrule. The interface may also have a second composite ferrule having an inwardly threaded portion opposite a pole receiving portion, the inwardly threaded portion tightly meshing with the outwardly threaded portion of the first composite ferrule to form a tight connection. The interface may also have a second pole bonded via the engineered adhesive to the second composite ferrule at the pole receiving portion of the second composite ferrule. Both first and second composite ferrules are characterized by a lack of any metallic and/or electrically conductive materials.

4 Claims, 11 Drawing Sheets

(56) References Cited

U.S. PATENT DOCUMENTS

| | | | | |
|---|---|---|---|---|
| 3,372,478 A * | 3/1968 | Wallace | A01G 3/0251 | 30/252 |
| 4,052,789 A * | 10/1977 | Ballas, Sr. | A01D 34/416 | 30/276 |
| 4,400,878 A * | 8/1983 | Vaudreuil | B25G 3/30 | 30/317 |
| 4,603,463 A * | 8/1986 | Wolbert | B23P 6/00 | 30/96 |
| 4,844,070 A * | 7/1989 | Dee | A61B 17/3213 | 279/42 |
| 5,333,824 A * | 8/1994 | Dubinsky | F16B 7/182 | 411/177 |
| 5,782,853 A * | 7/1998 | Zeevi | A61B 17/3468 | 606/187 |
| 6,422,780 B2 * | 7/2002 | Chen | A01G 3/0251 | 403/309 |
| 6,543,777 B2 | 4/2003 | Carbonero et al. | | |
| 7,131,982 B1 * | 11/2006 | Karapetyan | A61B 17/3213 | 30/340 |
| 7,207,897 B2 * | 4/2007 | Burch | A63B 53/02 | 473/307 |
| 7,331,567 B2 * | 2/2008 | Li | F16B 7/14 | 410/151 |
| 7,484,300 B2 * | 2/2009 | King | B27B 17/0008 | 30/296.1 |
| 7,743,683 B2 * | 6/2010 | Dayton | B25F 3/00 | 173/217 |
| 7,752,760 B2 * | 7/2010 | Baskar | A01G 3/0417 | 30/340 |
| 7,958,640 B1 * | 6/2011 | Mandriota | A01G 3/08 | 30/296.1 |
| 8,882,166 B2 * | 11/2014 | Ramsey | E04D 13/0765 | 294/210 |
| 8,939,051 B1 | 1/2015 | Lofley, Sr. et al. | | |
| 8,939,369 B2 | 1/2015 | Lofley, Sr. et al. | | |
| 9,114,291 B2 * | 8/2015 | Bolane | A63B 53/047 | |
| 9,591,809 B2 * | 3/2017 | Gieske | B25G 3/12 | |
| 9,839,315 B2 * | 12/2017 | Leung | A47G 33/06 | |
| 9,982,696 B1 * | 5/2018 | Hennessey | F16B 7/182 | |
| 10,688,647 B2 * | 6/2020 | Ackerman | B25F 5/02 | |
| 10,849,277 B2 * | 12/2020 | Bian | B25G 1/04 | |
| 10,945,381 B1 * | 3/2021 | Pringnitz | B25G 1/04 | |
| 11,090,690 B1 * | 8/2021 | Rotanelli | B25G 3/18 | |
| 11,167,181 B1 * | 11/2021 | Pallotta | A63B 53/02 | |
| 11,253,754 B2 * | 2/2022 | Kogawa | A63B 53/02 | |
| 11,333,182 B2 * | 5/2022 | Conrad | F16B 7/105 | |
| 2003/0050132 A1 * | 3/2003 | Wilbur | A63B 53/12 | 473/323 |
| 2003/0106223 A1 * | 6/2003 | Lee | A01G 3/08 | 30/249 |
| 2004/0011927 A1 | 1/2004 | Christman et al. | | |
| 2004/0255471 A1 * | 12/2004 | Black | B25H 1/0021 | 30/296.1 |
| 2005/0176521 A1 * | 8/2005 | Burch | A63B 53/02 | 473/307 |
| 2005/0180813 A1 * | 8/2005 | Van De Riet | F16B 37/002 | 403/307 |
| 2006/0048397 A1 * | 3/2006 | King | B25F 5/02 | 30/296.1 |
| 2007/0163065 A1 * | 7/2007 | Chang | B25G 1/04 | 15/144.4 |
| 2009/0064511 A1 * | 3/2009 | Crawford | B23D 51/01 | 30/162 |
| 2009/0100684 A1 * | 4/2009 | Doragrip | A01G 3/053 | 30/216 |
| 2009/0245924 A1 * | 10/2009 | Whitling | F16B 7/042 | 403/164 |
| 2010/0037469 A1 * | 2/2010 | Chubb | A01G 3/053 | 30/216 |
| 2010/0155549 A1 * | 6/2010 | Robinson | F16M 11/28 | 396/428 |
| 2010/0162528 A1 * | 7/2010 | Chen | B25G 1/10 | 16/422 |
| 2010/0170547 A1 * | 7/2010 | Pietrzak | F16B 7/1454 | 24/457 |
| 2010/0259041 A1 * | 10/2010 | Tsan | F16B 7/182 | 285/331 |
| 2011/0113635 A1 * | 5/2011 | Lee | A01G 3/0255 | 30/194 |
| 2012/0195681 A1 * | 8/2012 | Chen | F16B 37/0892 | 403/341 |
| 2013/0333229 A1 * | 12/2013 | Williams | B25G 1/04 | 30/296.1 |
| 2013/0340266 A1 * | 12/2013 | Miyawaki | A01G 3/083 | 30/517 |
| 2014/0000065 A1 * | 1/2014 | Bukovitz | C08L 23/14 | 403/345 |
| 2014/0033549 A1 * | 2/2014 | Ramsey | B05C 17/0205 | 30/381 |
| 2014/0090256 A1 * | 4/2014 | Pringnitz | A01G 3/083 | 30/151 |
| 2014/0373694 A1 * | 12/2014 | Strunk | B21D 45/06 | 30/90.1 |
| 2015/0089821 A1 * | 4/2015 | Troudt | B25G 3/18 | 16/427 |
| 2016/0000017 A1 * | 1/2016 | Pringnitz | A01G 3/083 | 30/151 |
| 2016/0114477 A1 * | 4/2016 | Saccoccio | B25B 11/002 | 294/190 |
| 2016/0177992 A1 * | 6/2016 | Lin | F16B 7/182 | 403/343 |
| 2016/0190781 A1 * | 6/2016 | Hendricks | H02G 1/04 | 294/132 |
| 2016/0236339 A1 * | 8/2016 | Flaherty | B25G 1/04 | |
| 2017/0081853 A1 * | 3/2017 | Kim | E04C 5/165 | |
| 2017/0211603 A1 * | 7/2017 | Kennair, Jr. | F41A 11/02 | |
| 2017/0284385 A1 * | 10/2017 | Goss | F04B 39/14 | |
| 2018/0001489 A1 * | 1/2018 | Scimone | B26B 5/00 | |
| 2018/0216646 A1 | 8/2018 | Pikarski | | |
| 2020/0009712 A1 * | 1/2020 | Lin | B25G 1/00 | |
| 2020/0018088 A1 * | 1/2020 | Yang | E04H 15/44 | |
| 2020/0157819 A1 * | 5/2020 | Lee | E04C 5/165 | |
| 2020/0284409 A1 * | 9/2020 | Lingelbach | B25J 1/04 | |
| 2020/0298356 A1 * | 9/2020 | Witte | A61B 17/8665 | |
| 2020/0331764 A1 * | 10/2020 | Hoshino | C01B 33/035 | |
| 2021/0054863 A1 * | 2/2021 | Sultan | F16B 7/10 | |

OTHER PUBLICATIONS

International Search Report and Written Opinion of corresponding International Application No. PCT/US2019/047187 dated Nov. 5, 2019; 9 pages.

* cited by examiner

COMPOSITE FERRULES FOR EXTENSION POLES

CROSS-REFERENCE TO RELATED APPLICATIONS

This is a national stage patent application claiming the benefit of and priority to International Application No. PCT/US19/47187, filed Aug. 20, 2019, which claims the priority of U.S. Provisional Application No. 62/768,338, filed Nov. 21, 2018, both of which are hereby incorporated by reference in their entireties.

TECHNICAL FIELD AND BACKGROUND OF THE INVENTION

The present invention relates to the field of extension poles and more particularly to ferrules used to connect sections of extension poles. The present invention includes a non-conductive ferrule connection interface made from a composite material and having a threaded connection.

Fiberglass extension poles, also known as layup sticks or hot sticks, are used for many applications of overhead work. Tree trimming and cable installation or maintenance are just two examples. Other examples include pole pruners, pole saws, line clearance tree trimming, and aerial construction and maintenance tools. Fiberglass construction is desirable because it is strong, lightweight, and is a very effective insulator. Conventional connection fittings, or "ferrules," are constructed of aluminum or steel. The fittings typically fit together in an internal/external sleeve interface and utilize a locking pin or button to secure the connection.

Ferrules of this design are electrically conductive due to the material properties. This introduces a discontinuity of insulating properties between sections of fiberglass pole. When accessories such as saw blade mounting heads or pruning heads are installed at the upper pole end, the metal ferrule also contributes to the overall length of conductive material at the top of the pole. When using poles near live lines such as during tree-trimming line clearance, excessive lengths of metal components can contribute to increased risks of utility damage by short circuit, or to risks of user safety. Metal ferrules also limit the maximum dielectric withstand rating of a multi-pole system due to the ferrules being electrically conductive between the fiberglass pole sections.

The mating sleeve interface of conventional metal ferrules also creates a degree of looseness or "slop" between connections due to the required clearances. This allows more deflection to occur when multiple pole sections are connected than a tight connection would allow. Excessive deflection prevents the user from controlling the pole sections in the most efficient and safe manner desirable.

Thus, there is a long felt need in the art for an improved ferrule system for extension poles.

BRIEF SUMMARY OF THE INVENTION

It is therefore an object of the present invention to provide a ferrule connection interface having a first composite ferrule having an outwardly threaded portion opposite a pole receiving portion, a second composite ferrule having an inwardly threaded portion opposite a pole receiving portion, the inwardly threaded portion tightly meshing with the outwardly threaded portion of the first composite ferrule to form a tight connection. According to the invention, the inwardly threaded portion of the second composite ferrule is recessed sufficiently to form an overlapping sleeve when meshed with the outwardly threaded portion of the first composite ferrule.

According to another embodiment of the invention, both first and second composite ferrules are characterized by a lack of any metallic and/or electrically conductive materials.

According to another embodiment of the invention, a first pole is connected to the first composite ferrule at the pole receiving portion of the first composite ferrule and a second pole is connected to the second composite ferrule at the pole receiving portion of the second composite ferrule.

According to another embodiment of the invention, the first pole is bonded via an engineered adhesive to the first composite ferrule and the second pole is bonded via the engineered adhesive to the second composite ferrule.

According to another embodiment of the invention both the first and second composite ferrules may be made from glass-reinforced polymer.

According to another embodiment of the invention, both the first and second composite ferrules may be high-strength, impact resistant, and resistant to ultraviolet light.

According to another embodiment of the invention, both the first and second composite ferrules may have extremely high electrical resistivity, may be an effective insulator, and may be non-conductive.

According to another embodiment of the invention, the outwardly threaded portion of the first composite ferrule and the inwardly threaded portion of the second composite ferrule may include oversized thread profile for promoting ease of cleaning and quick connection of poles or accessories.

According to another embodiment of the invention, the tight connection may be a strong, rigid connection.

According to another embodiment of the invention, the first and second composite ferrules may be mechanically attached to the respective first and second poles with rivets made from a non-conducive material.

According to another embodiment of the invention, the first and second composite ferrules may each further include surface texture on outer surface of ferrule for improved user grip.

According to another embodiment of the invention, the pole receiving portion of the first and second composite ferrules may each further include surface texture on an inner surface of the pole receiving portion for improved adhesive bond.

According to another embodiment of the invention, a third composite ferrule may have an inwardly or outwardly threaded portion opposite a pole receiving portion, the third composite ferrule connected to the second pole at an end of the second pole opposite the second composite ferrule. According to the invention, the inwardly or outwardly threaded portion is removably attachable to a tool.

According to another embodiment of the invention, the first, second, and third composite ferrules may be characterized by a lack of any metallic and/or electrically conductive materials.

According to another embodiment of the invention, the tool may have an outwardly or inwardly threaded composite ferrule attached to one or more of: a pruner and a rope, a double pulley pruner and a rope, a saw head, a saw blade, a hook saw blade and belting scabbard, and/or a limb and wire raiser.

According to another embodiment of the invention, the ferrule connection may show no sign of puncture, tracking, or erosion on any surface of the ferrule connection or any perceptible temperature rise when subjected to an alternating voltage of 100 kV rms at a maximum voltage rise of 3000 V/s applied between electrodes spaced 12 inches apart for 5 minutes.

According to another embodiment of the invention, the ferrule connection interface has a first composite ferrule having an outwardly threaded portion opposite a pole receiving portion, a first pole bonded via an engineered adhesive to the first ferrule at the pole receiving portion of the first ferrule, a second composite ferrule having an inwardly threaded portion opposite a pole receiving portion, the inwardly threaded portion tightly meshing with the outwardly threaded portion of the first composite ferrule to form a tight connection, and a second pole bonded via the engineered adhesive to the second ferrule at the pole receiving portion of the second ferrule. According to this specific embodiment, the inwardly threaded portion of the second composite ferrule is recessed sufficiently to form an overlapping sleeve when meshed with the outwardly threaded portion of the first composite ferrule, and both first and second composite ferrules are characterized by a lack of any metallic and/or electrically conductive materials.

According to another embodiment of the invention, the method for connecting sections of an extension pole includes providing a first composite ferrule having an outwardly threaded portion opposite a pole receiving portion and a second composite ferrule having a recessed inwardly threaded portion defining an overlapping sleeve opposite a pole receiving portion, connecting the pole receiving portion of the first composite ferrule to a first pole, connecting the pole receiving portion of the second composite ferrule to a second pole, and then tightening the outwardly threaded portion of the first composite ferrule to the inwardly threaded portion of the second composite ferrule to form a tight connection with the overlapping sleeve of the second composite ferrule overlapping at least a portion of the pole receiving portion of the first composite ferrule.

According to another embodiment of the invention, the method for connecting sections of an extension pole includes connecting a third composite ferrule having an outwardly or inwardly threaded portion opposite a pole receiving portion to the second pole on an end opposite the second composite ferrule, and connecting a tool to the outwardly or inwardly threaded portion of the third composite ferrule.

According to another embodiment of the invention, the tool is one or more of: a pruner and a rope, a double pulley pruner and a rope, a saw head, a saw blade, a hook saw blade and belting scabbard, and/or a limb and wire raiser.

BRIEF DESCRIPTION OF THE DRAWINGS

Features, aspects and advantages of the present invention are understood when the following detailed description of the invention is read with reference to the accompanying drawings, in which.

DETAILED DESCRIPTION OF THE INVENTION

Figure 1:
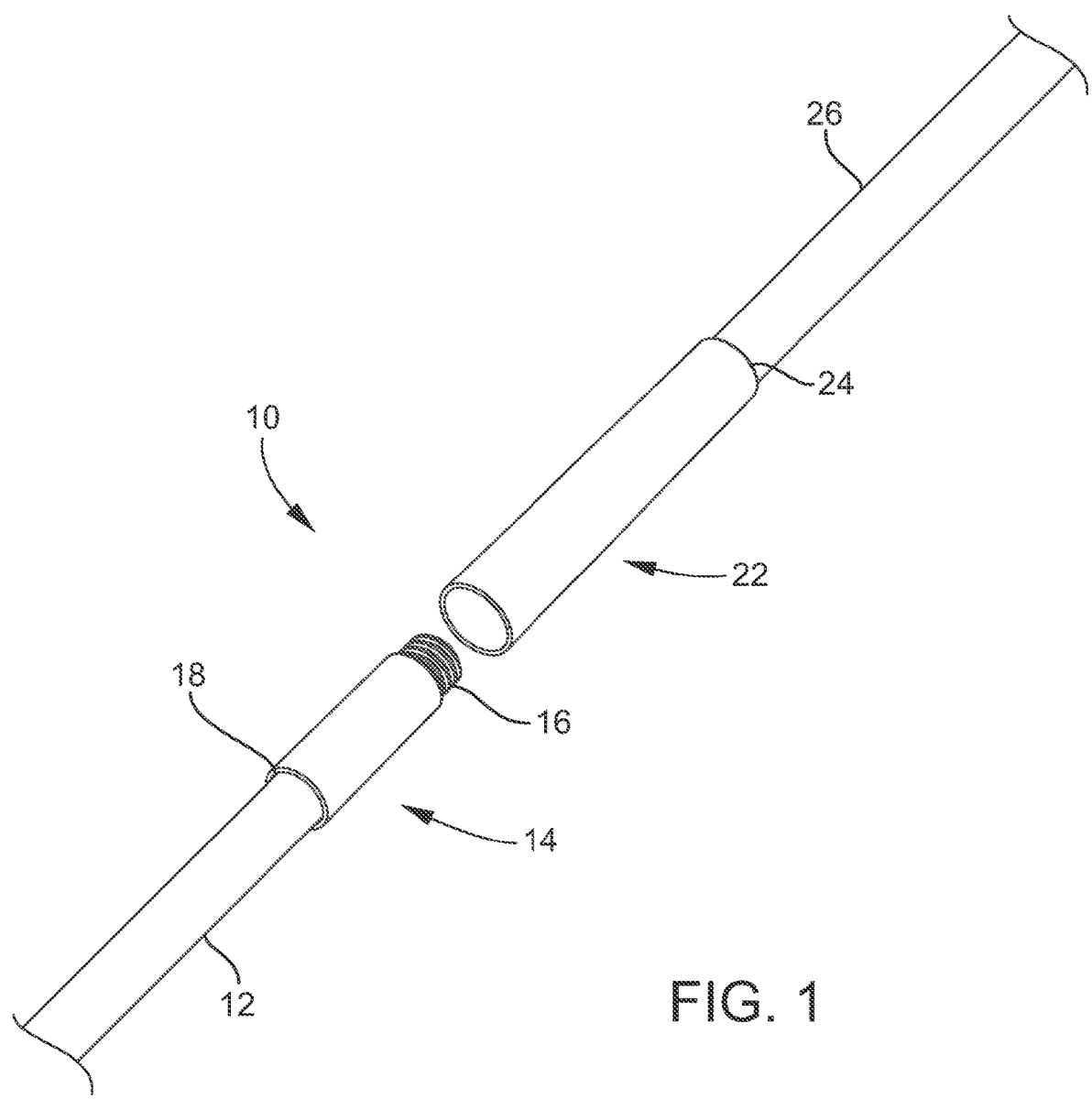
FIG. 1 is an exploded perspective view of an embodiment of the invention.

A preferred embodiment according to the invention is described in detail below. The invention is a non-conductive ferrule connection interface having a screw-together threaded design 10. The ferrules facilitate attaching one or more poles together to form an extension pole such that a tool may be attached.

As shown in FIGS. 1-12, the invention 10 includes a first pole 12 attached to a first composite ferrule 14. The first composite ferrule 14 has an outwardly threaded portion 16 and a pole receiving portion 18. The first pole 12 is attached to the pole receiving portion 18. As shown, the pole receiving portion 18 is a female receiver that has a diameter just larger than the diameter of the first pole 12. An engineering adhesive is applied to the receiving portion 18 and fixes the first pole 12 to the first composite ferrule 14. Further, a first rivet 20 is attached to the first pole 12 and the first composite ferrule 14. This fixed attachment ensures a solid, immovable connection between the first pole 12 and the first composite ferrule 14.

A second composite ferrule 22 is made in like manner to the first composite ferrule 14. The second composite ferrule 22 has a pole receiving portion 24 for receiving a second pole 26 and an inwardly threaded portion 28. The threads of the inwardly threaded portion 28 are recessed sufficient to form an overlapping sleeve 30 when meshed with the outwardly threaded portion 16 of the first composite ferrule 14. This feature is shown disassembled in FIG. 2 and assembled in FIG. 3. Like the first ferrule 14, second composite ferrule 22 pole receiving portion 24 has a diameter just larger than the diameter of the second pole 26. An engineering adhesive is applied to the receiving portion 24 and fixes the second pole 26 to the second composite ferrule 22. The overlapping sleeve 30 is a female receiver which overlaps the first composite ferrule 14 when assembled to provide additional rigidity to the connected poles. Additional engineering adhesive may be applied to the overlapping sleeve 30 to fix the second composite ferrule 22 to the first composite ferrule 14. Further, a second rivet 32 is attached to the second pole 26 and the second composite ferrule 22. This fixed attachment ensures a solid, immovable connection between the second pole 26 and the second composite ferrule 22.

Figure 2:
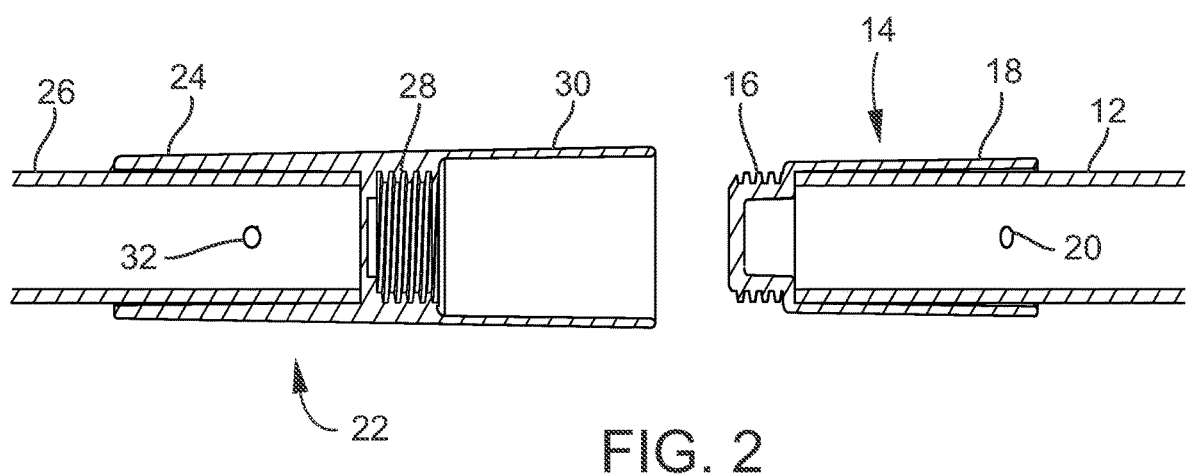
FIG. 2 is an exploded side cutaway view of an embodiment of the invention.
Figure 3:
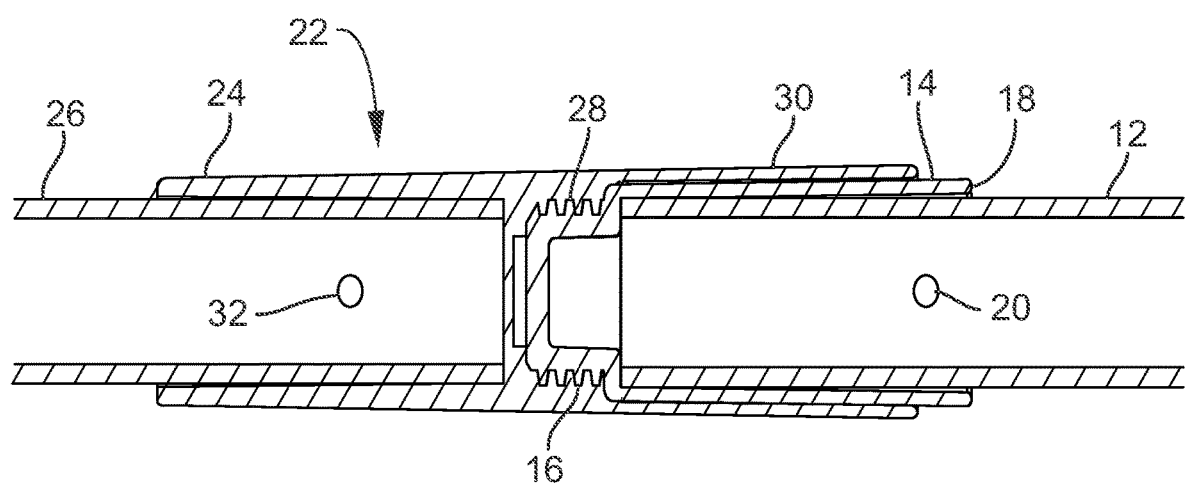
FIG. 3 is a side cutaway view of an embodiment of the invention.
Figure 4:
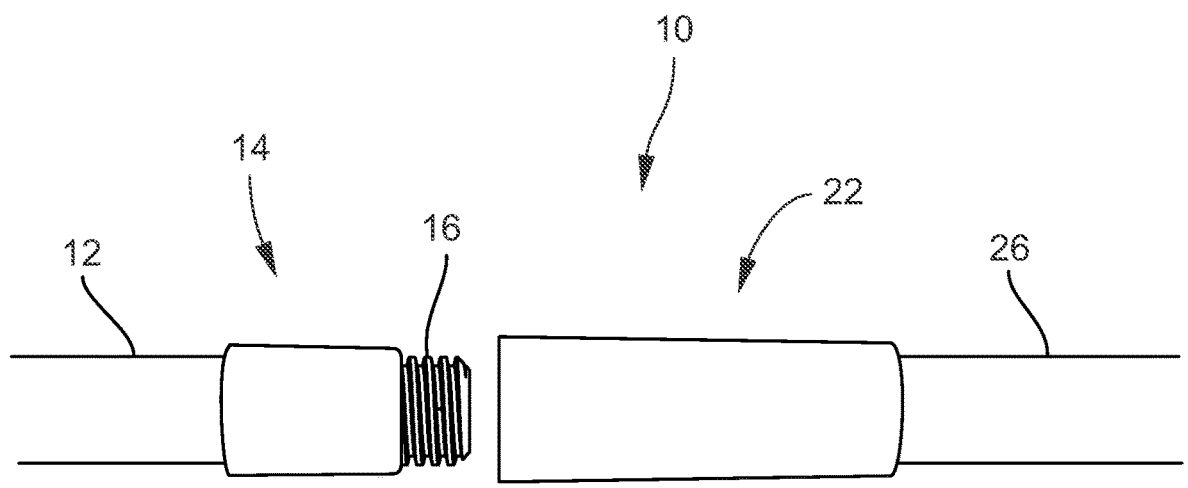
FIG. 4 is an exploded side view of an embodiment of the invention.

The overlapping sleeve 30 of the second composite ferrule 22 may be of a sufficient length to completely overlap and cover the first composite ferrule 14, may be of a relatively greater length, or may be of a relatively shorter length such that the first composite ferrule 14 is not completely overlapped. FIG. 3 shows the overlapping sleeve 30 of a length which does not completely cover the first composite ferrule 14. Along the same lines, the rivets 20, 32 may only pass through their respective ferrules 14, 22 and poles 12, 26 or may pass through both the first and second composite ferrule 14, 22. Specifically, as shown in FIG. 2, the rivet 20 may pass through the overlapping sleeve 30 of the second composite ferrule 22, the pole receiving portion 18 of the first composite ferrule 14 and finally the first pole 12.

Figure 5:
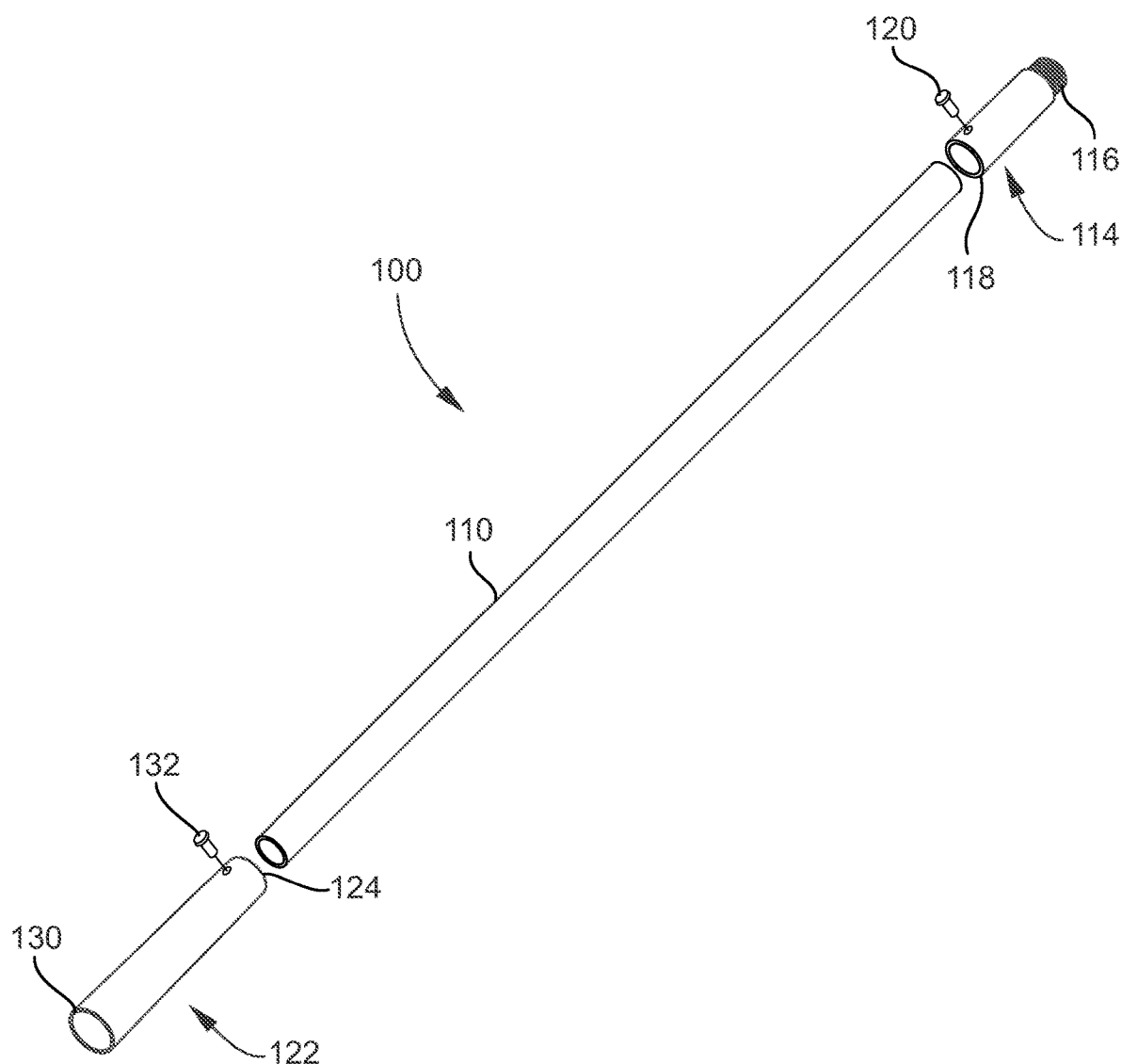
FIG. 5 is an exploded perspective view of an embodiment of the invention.
Figure 6:
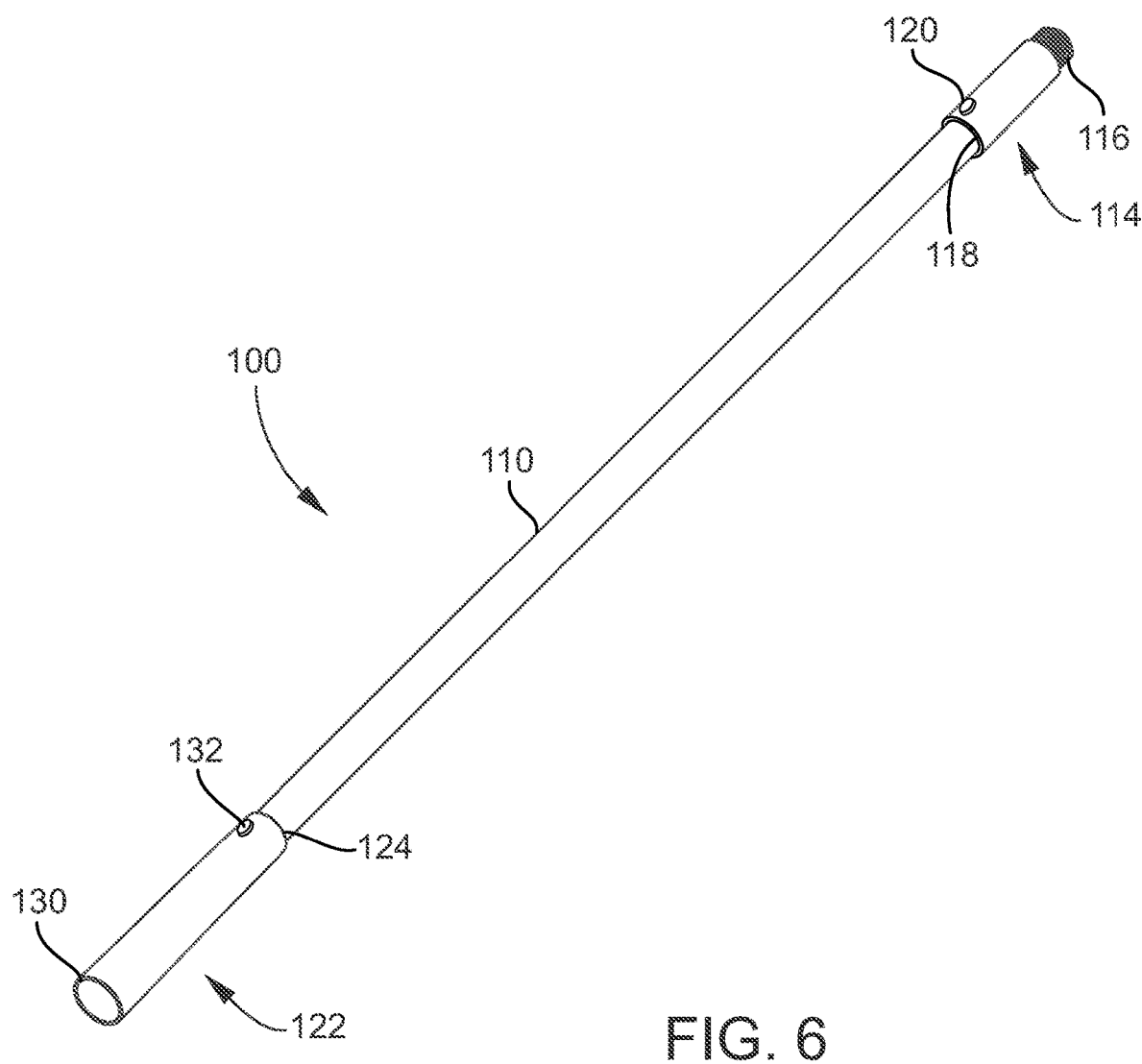
FIG. 6 is a perspective view of an embodiment of the invention.

FIGS. 5 and 6 show an example pole section 100 with a first composite ferrule 114 on one end of a pole 110 and a second composite ferrule 122 on an opposing end of the pole 110. The first composite ferrule 114 has an outwardly threaded portion 116 and a pole receiving portion 118. The second composite ferrule 122 has an inwardly threaded portion (not shown) recessed in an overlapping sleeve 130 and a pole receiving portion 124. Rivets 120, 132 connect the first and second composite ferrules 114, 122 to the pole 110. Each respective ferrule 114, 122 may be mated with a corresponding ferrule 114, 122. Another pole section (not shown) with another first composite ferrule on one end may be mated to the second composite ferrule 122 of the example pole section 100 and vice versa with the first composite ferrule 114 on the example pole section 100. As many pole sections as desired may be attached together in such a manner.

Figure 7:
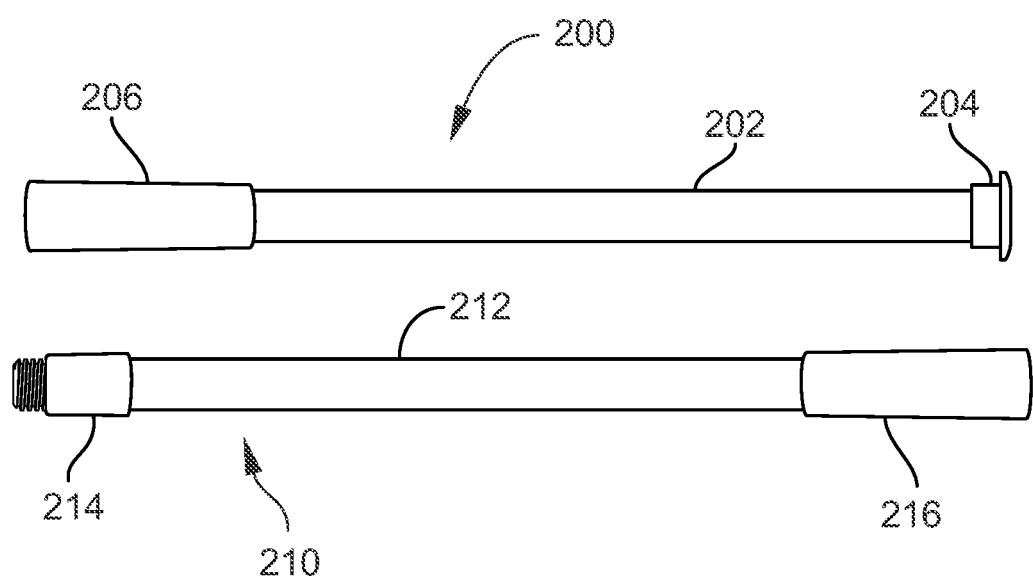
FIG. 7 is a side view of an unassembled embodiment of the invention.

A terminal end pole section 200 and an extension pole section 210 are shown in FIG. 7. The terminal end pole section 200 has a pole 202 with a second composite ferrule 206 on one end and a terminal stopper 204 on the opposing end. The terminal stopper 204 may be just a rubber stopper, or may be an ergonomic handle. A pole extension section 210 with a pole 212 and first and second composite ferrules 214, 216 on opposing ends would be attached to the second composite ferrule 206 of the terminal end pole section 200 in order to assemble the extension pole.

Figure 8:
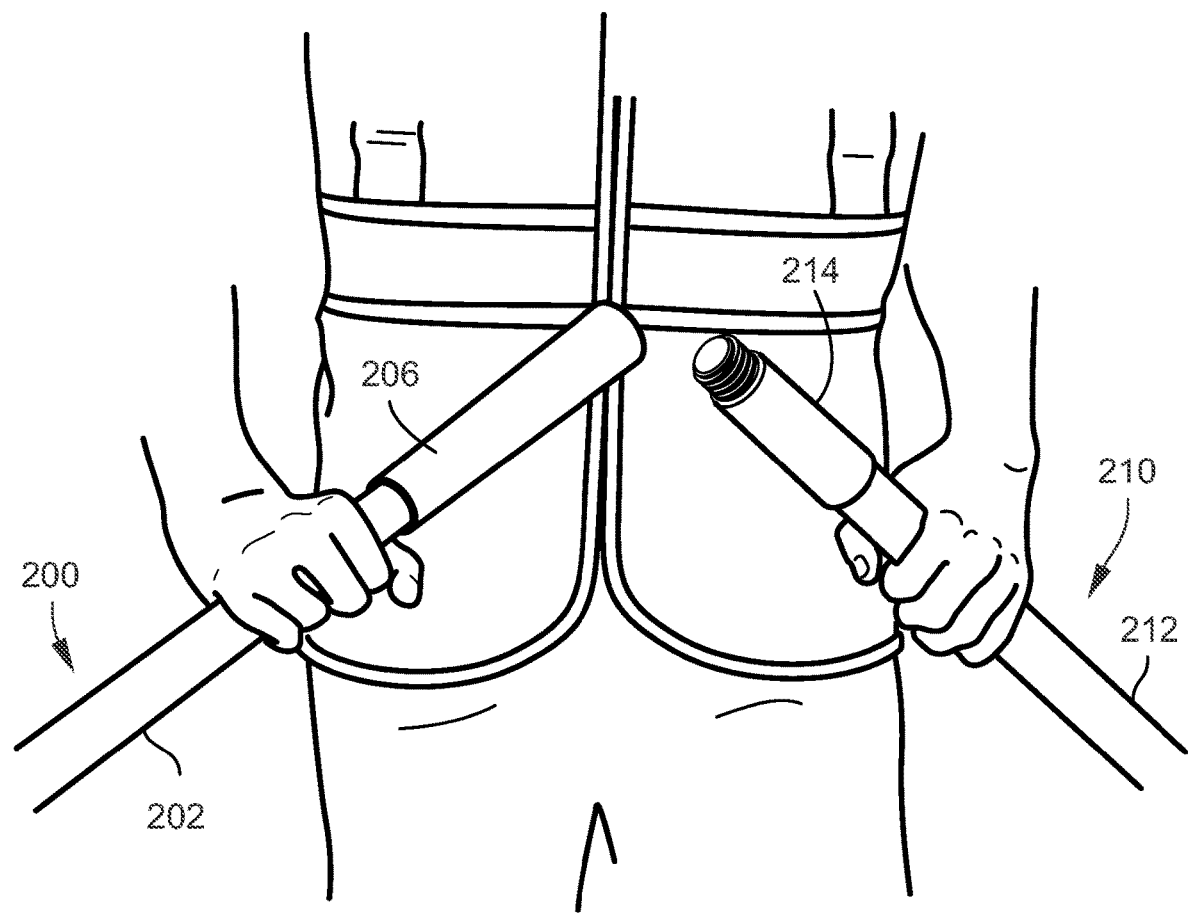
FIG. 8 is a perspective view of an embodiment of the invention.

Each pole extension section 210 may be assembled by attaching first and second composite ferrules 206, 214 to each end of the poles 202, 212 and applying engineering adhesive as needed to secure the ferrules 206, 214 to the ends of the poles 202, 212. As shown in FIG. 8, assembly of pole extension sections 202, 210 is performed by twisting together coordinating composite ferrules 206, 214 in order to thread the inwardly and outwardly threaded portions together. Additional engineering adhesive may be applied prior, during, or after threading the pole extension sections 202, 210 together. Rivets may be attached prior to assembly of multiple pole extension sections or may be attached after the pole extension sections have been connected.

One of skill in the art will understand that multiple sections and combinations of ferrules and poles may be extended together depending upon a particular application. That is, there may be a first, second, third, fourth, fifth, etc. . . . ferrules connecting in series first, second, third, fourth, etc. . . . poles.

Figure 9:
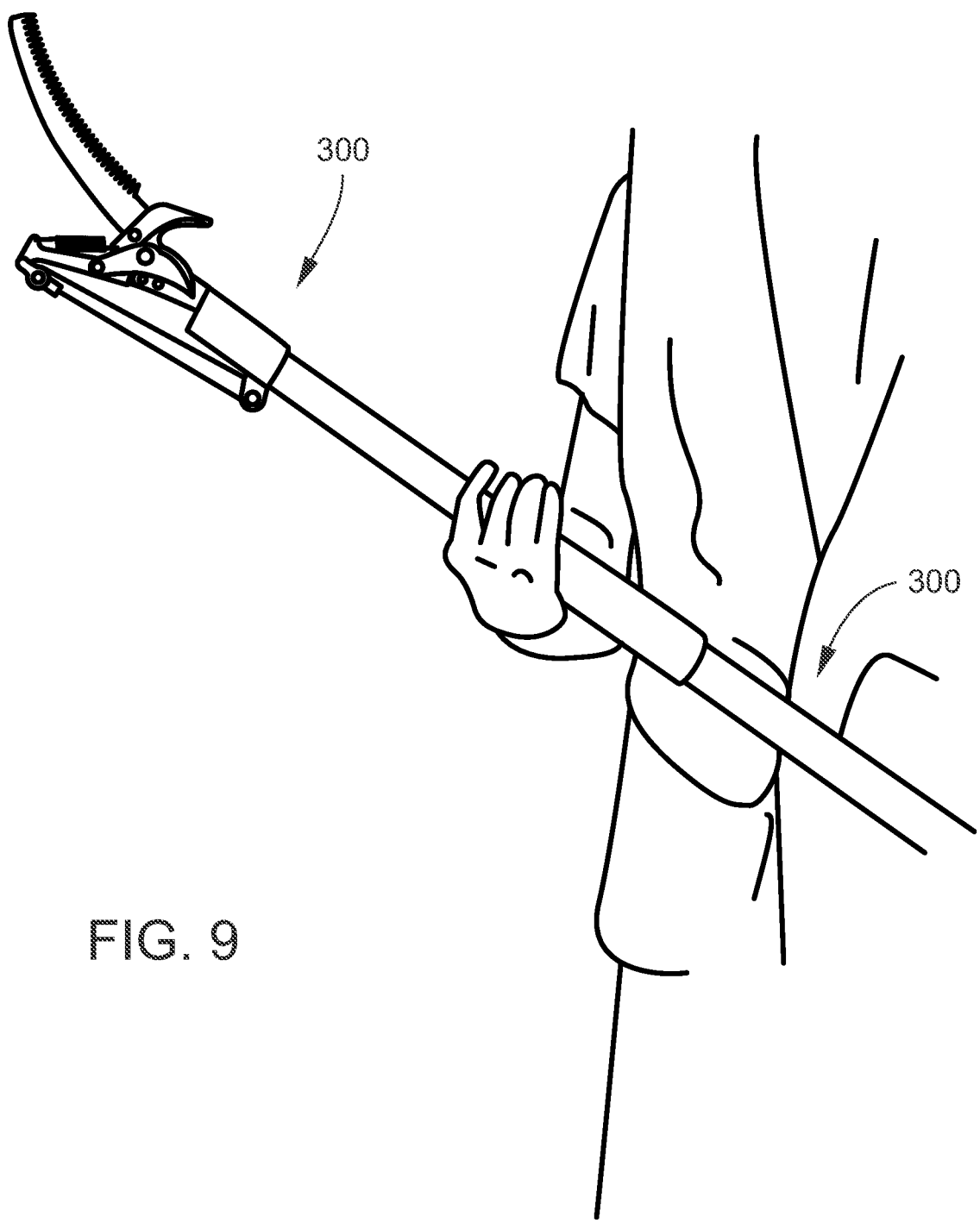
FIG. 9 is perspective view of a tool end portion of the invention.
Figure 10:
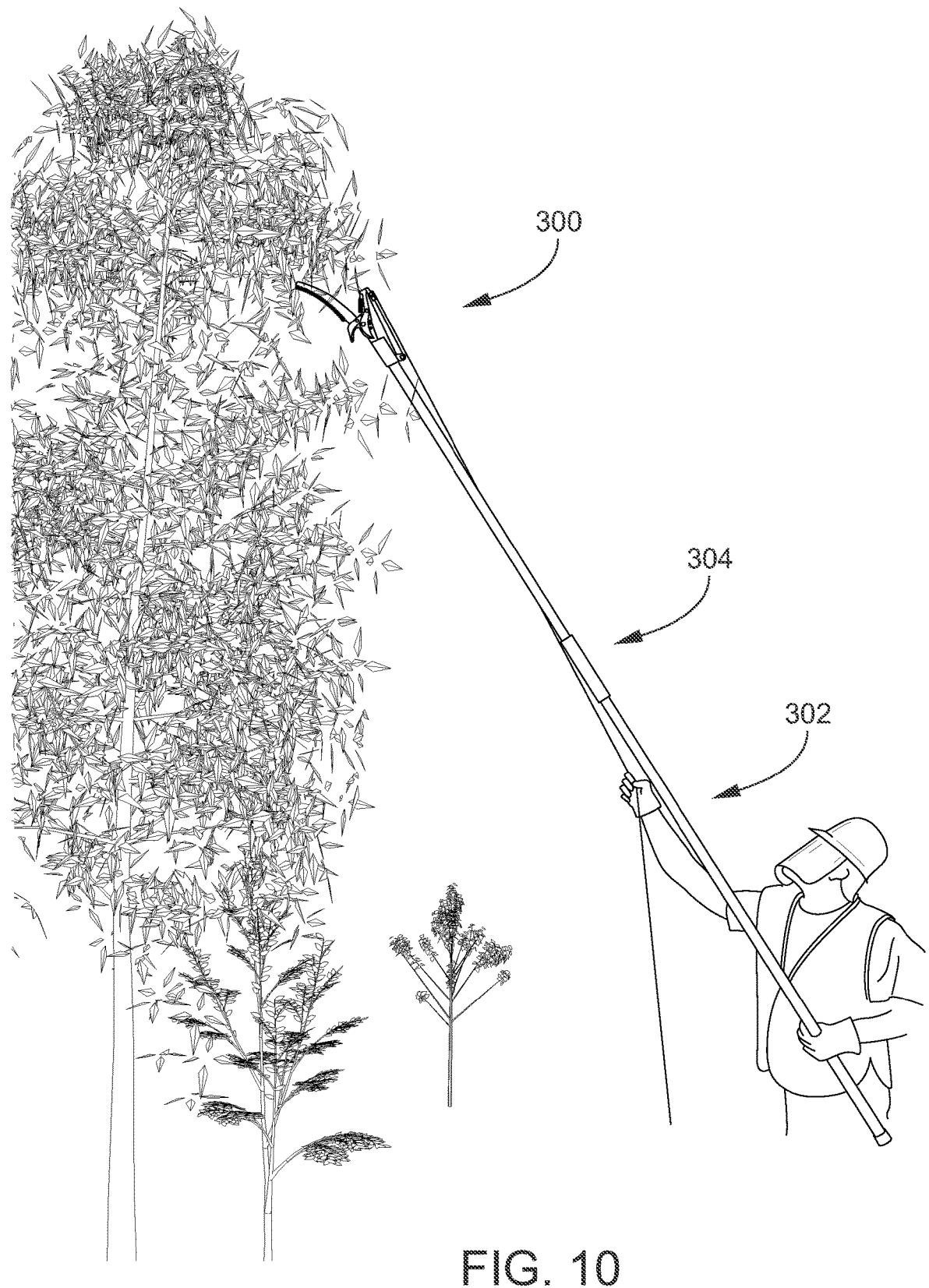
FIG. 10 is a perspective view of an embodiment of the invention in use.

As shown in FIGS. 9 and 10, at the end of the series, rather than a further pole, a tool 300 may be attached to a final pole section 302. The tool 300 may be one or more of: a pruner and a rope, a double pulley pruner and a rope, a saw head, a saw blade, a hook saw blade and belting scabbard, and/or a limb and wire raiser. The final pole section 302 may have an additional ferrule 304 which connects the tool 300 to the final pole section 302. The additional ferrule 304 may be similar to the aforementioned first composite ferrule 14 and have an outwardly threaded portion opposite a pole receiving portion or may be similar to the aforementioned second composite ferrule 22 and have an inwardly threaded portion opposite a pole receiving portion. The tool 300 may have a corresponding outwardly or inwardly threaded portion adapted to connect to the additional ferrule 304. The additional ferrule 302 may have one or more rivets.

Both the first and second ferrules 14, 22 are made from a composite non-conductive material. This material may be a fiber reinforced composite to maintain insulating properties across the pole sections. This material may be a fiber reinforced polyamide. The material may be high-strength to minimize cracks and stress and strain failures. The material may also be impact resistant and ultraviolet light resistant. Rivets 20, 32 may also be made of the same material as the first and second ferrules 14, 22 or made of a different non-conductive suitable material. Each ferrule 14, 22 may have one or more rivets or may have no rivets. The additional ferrule 302 may be made of the same material as the first and second ferrules 14, 22 or may be made of a different suitable material.

The non-conductive composite ferrules enhance dielectric strength from top to bottom, improving user safety while performing tree trimming and line clearance around overhead utility lines. Surfaces on the inner and outer diameters of the pole receiving portions of both ferrules, and the outer diameter of the poles may have textures to improve grip or adhesive bond.

The outwardly threaded and inwardly threaded portions of the first and second ferrules have over-sized thread profiles in order to provide strong secure pole-to-pole connections. This connection eliminates loose fitment or "slop" problems which are present in metallic designs. The overlapping sleeve 30 and the threaded connection allows a secure and tight fit that is free from any movement, play, or slop once connected. This prevents unwanted deflection from occurring at the ferrule connection, which assists the user by improving balance and control, allowing more accurate positioning of the tool at the end of the pole on or near the branch to be cut. Conventional aluminum ferrule connections allow a deflection within the connection of at least 1°. As the aluminum ferrule wears out from normal use, it can deform and further increase this deflection angle. This deflection angle is multiplied by the total number of ferrules in the pole system. This total deflection prevents optimal use since it is more difficult to balance and control the placement of the tool. The result of the present connection is improved rigidity to the entire working length of the assembled pole system. In addition, the resulting connection is less binding, easy to clean, and quicker to assemble extension sections and tools or accessories.

Figure 11:
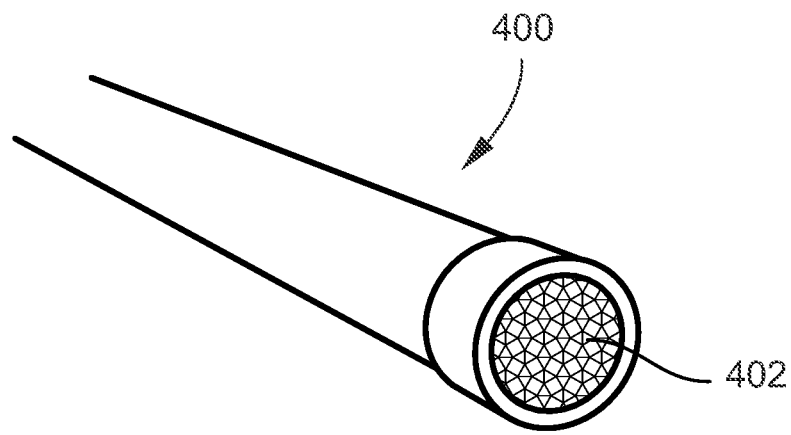
FIG. 11 is a perspective view of a foam filled pole embodiment of the invention.
Figure 12:
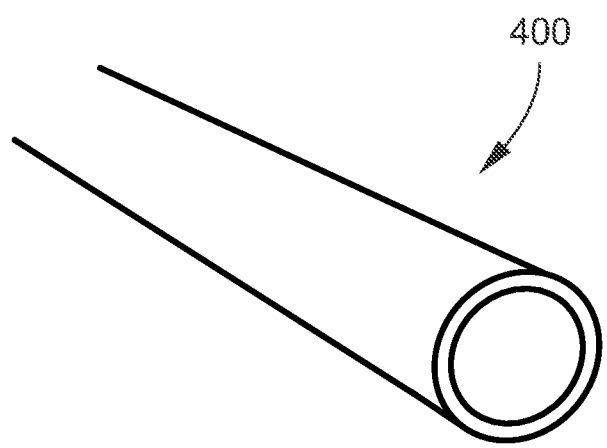
FIG. 12 is a perspective view of a hollow pole embodiment of the invention.

The pole may be made from a composite or from a fiberglass, or glass-reinforced polymer. As shown in FIGS. 11 and 12, the poles may be hollow or filled with foam 402. Foam filled poles may be preferred for aerial construction and line clearance. Hollow core poles may be preferred for tree trimming and aerial construction. The hollow core pole may be stronger and lighter than the foam core pole.

The non-conductive composite ferrule connection interface having a screw-together threaded design according to the present invention are built with fiber reinforced composite ferrules to maintain insulating properties across pole sections for line-clearance, tree trimming, and to provide more secure pole connections for all users, from telecom installers to professional arborists and landscapers. The ferrule connection of the present invention shows no sign of puncture, tracking, or erosion on any surface of the ferrule connection or any perceptible temperature rise when subjected to an alternating voltage of 100 kV rms at a maximum voltage rise of 3000 V/s applied between electrodes spaced 12 inches apart for 5 minutes.

What is claimed is:

1. A method for connecting sections of an extension pole comprising:
   (a) providing a first composite ferrule having an outwardly threaded portion opposite a pole receiving portion and providing a second composite ferrule having a recessed inwardly threaded portion defining an overlapping sleeve opposite a pole receiving portion wherein both first and second composite ferrules are characterized by a lack of any metallic and/or electrically conductive materials;
   (b) connecting the pole receiving portion of the first composite ferrule to a first pole by inserting an end of the first pole into the pole receiving portion of the first composite ferrule;
   (c) connecting the pole receiving portion of the second composite ferrule to a second pole by inserting an end of the second pole into the pole receiving portion of the second composite ferrule;
   (d) tightening the outwardly threaded portion of the first composite ferrule to the inwardly threaded portion of the second composite ferrule to form a connection with the overlapping sleeve of the second composite ferrule overlapping at least a portion of the pole receiving portion of the first composite ferrule, wherein a first diametric step is defined by a diameter of an exterior of the pole receiving portion of the first composite ferrule being greater than a diameter of an exterior of the first pole, and a second diametric step is defined by a diameter of an exterior of the overlapping sleeve of the second composite ferrule being greater than the diameter of the exterior of the pole receiving portion of the first composite ferrule;
   (e) connecting a third composite ferrule having an outwardly or inwardly threaded portion opposite a pole receiving portion to the second pole on an end opposite the second composite ferrule;
   (f) connecting a tool to the outwardly or inwardly threaded portion of the third composite ferrule, wherein the tool is one or more of: a pruner and a rope, a double pulley pruner and a rope, a saw head, a saw blade, a hook saw blade and belting scabbard, and/or a limb and wire raiser.

2. The method of claim 1, wherein: the pole receiving portion of the first composite ferrule is internally and externally unthreaded; and the pole receiving portion of the second composite ferrule is internally and externally unthreaded.

3. The method of claim 2, wherein when the connection is formed, the overlapping sleeve of the second composite ferrule overlaps a portion of the pole receiving portion of the first composite ferrule and a portion of the first pole.

4. The method of claim 3, wherein when the connection is formed, a portion of the pole receiving portion of the first composite ferrule extends longitudinally along a portion of the first pole beyond a terminal end of the overlapping sleeve of the second composite ferrule.

* * * * *